(12) United States Patent
Krajnik et al.

(10) Patent No.: US 10,293,453 B2
(45) Date of Patent: May 21, 2019

(54) METHOD OF GRINDING A WORKPIECE AND METHOD FOR DETERMINING PROCESSING PARAMETERS

(71) Applicant: SCANIA CV AB, Södertälje (SE)

(72) Inventors: Peter Krajnik, Stockholm (SE); Radovan Drazumeric, Medvode (SI)

(73) Assignee: SCANIA CV AB, Södertälje (SE)

( * ) Notice: Subject to any disclaimer, the term of this patent is extended or adjusted under 35 U.S.C. 154(b) by 173 days.

(21) Appl. No.: 15/310,502

(22) PCT Filed: May 6, 2015

(86) PCT No.: PCT/SE2015/050496
§ 371 (c)(1),
(2) Date: Nov. 11, 2016

(87) PCT Pub. No.: WO2015/178819
PCT Pub. Date: Nov. 26, 2015

(65) Prior Publication Data
US 2017/0072527 A1    Mar. 16, 2017

(30) Foreign Application Priority Data

May 23, 2014    (SE) ..................................... 1450617

(51) Int. Cl.
*B24B 49/12*    (2006.01)
*B24B 19/12*    (2006.01)
(Continued)

(52) U.S. Cl.
CPC ............ *B24B 19/125* (2013.01); *B24B 49/14* (2013.01); *B24B 51/00* (2013.01); *G05B 19/40937* (2013.01); *Y02P 90/265* (2015.11)

(58) Field of Classification Search
CPC ....... B24B 49/12; B24B 19/12; B24B 19/125; B24B 51/00
(Continued)

(56) References Cited

U.S. PATENT DOCUMENTS 4,528,781 A  *  7/1985  Koide ................... B24B 19/125
                                                        451/62
4,621,463 A  *  11/1986  Komatsu ............... B24B 19/125
                                                        451/58
(Continued)

FOREIGN PATENT DOCUMENTS

CN       1921984 A       2/2007
CN     103802023 A       5/2014
(Continued)

OTHER PUBLICATIONS

"Cycle optimization in cam-lobe grinding for high productivity"; In: Krajnik et al: "CIRP Annals—Manufacturing Technology". Apr. 13, 2014 (Apr. 13, 2014). XP29033586, cited in the application—the whole document.
(Continued)

*Primary Examiner* — Robert Rose
(74) *Attorney, Agent, or Firm* — Moore & Van Allen PLLC; W. Kevin Ransom

(57) ABSTRACT

The present disclosure relates to a grinding method for grinding of non-circular workpieces with an improved productivity and quality of the resulting workpiece. The method comprises a first and a second stage. The rotational speed profile of the workpiece in the first stage is controlled with the purpose of maintaining a pre-selected maximum surface temperature of the workpiece during said first stage, and grinding of the workpiece in said second stage is performed while controlling an aggressiveness number of said second stage so as to achieve an intended final surface quality. The present disclosure also relates to a method for determining (Continued)

the processing parameters of such a grinding method wherein the first and the second stage of the grinding method are iterated to thereby determine the processing parameters leading to a high productivity and desired quality of the workpiece after grinding.

18 Claims, 3 Drawing Sheets

(51) Int. Cl.
    *B24B 51/00*         (2006.01)
    *B24B 49/14*         (2006.01)
    *G05B 19/4093*    (2006.01)

(58) Field of Classification Search
    USPC .......................... 451/5, 8–10, 62, 7, 53, 58
    See application file for complete search history.

(56) References Cited

U.S. PATENT DOCUMENTS 4,905,418 A * 3/1990 Wedeniwski ........ G05B 19/184
                                             451/46
6,811,465 B1 * 11/2004 Mavro-Michaelis ..... B24B 1/00
                                             451/11

FOREIGN PATENT DOCUMENTS

| EP | 139280 A2 | 5/1985 |
|---|---|---|
| JP | 2009083049 A | 4/2009 |
| JP | 2009184063 A | 8/2009 |
| WO | 2001/30534 A2 | 5/2001 |

OTHER PUBLICATIONS

"Optimization of peripheral non-round cylindrical grinding via an adaptable constant-temperature process" In: Krajnik et al.: "CIRP Annals—Manufacturing Technology", 2013, XP28565569, vol. 62, pp. 347-350, cited in the application—the whole document.
"Factors Affecting Wheel Collapse in Grinding"; In: Badger: CIRP Annas—Manufacturing Technology, 2009, XP26120270, vol. 58, pp. 307-310, cited in the application—the whole document.
International Preliminary Report on Patentability for PCT/SE2015/050496 dated Nov. 29, 2016.
International Search Report for PCT/SE2015/050496 dated Aug. 12, 2015.
Written Opinion of the International Search Authority for PCT/SE2015/050496 dated Aug. 12, 2015.
Swedish Office Action for Patent Application No. 1450617-4 dated Dec. 4, 2014.
Notice of Reasons for Rejection for Japanese National Phase of PCT/SE2015/050496 dated Nov. 30, 2017.
Krajnik et al., Cycle optimization in cam-lobe grinding for high productivity, CIRP Annals Manufacturing Technology, CIRP, The International Academy for Production Engineering, Apr. 13, 2014, vol. 63, Issue 1, p. 333-336.
Chinese Office Action for Chinese Patent Application No. 2015800253972 dated Jan. 19, 2018.
Chinese Office Action for Chinese Patent Application No. 2015800253972 dated Jun. 12, 2018.

* cited by examiner

METHOD OF GRINDING A WORKPIECE AND METHOD FOR DETERMINING PROCESSING PARAMETERS

CROSS-REFERENCE TO RELATED APPLICATION(S)

This application is a national stage application (filed under 35 § U.S.C. 371) of PCT/SE2015/050496, filed May 6, 2015 of the same title, which, in turn claims priority to Swedish Application No. 1450617-4, filed May 23, 2014 of the same title; the contents of each of which are hereby incorporated by reference.

FIELD OF THE INVENTION

The present disclosure relates in general to method of grinding a workpiece, such as a non-circular workpiece, by means of an essentially rotational symmetrical grinding wheel. The present disclosure also relates to a method of determining processing parameters of such a grinding method.

BACKGROUND OF THE INVENTION

Grinding of non-circular workpieces (also known in the art as non-round workpieces), such as cam lobes, by means of grinding wheel presents difficulties not found in grinding operations of rotationally-symmetrical workpieces. The contact area between the workpiece and the grinding wheel is continuously changing as the grinding wheel passes around the perimeter/circumference of the workpiece. For example in the case of cam lobes, the contact area is considerably larger in the flank portion than in the nose portion or the base circle portion. Therefore, optimization of grinding method for non-circular workpieces offers several difficulties and the success often depends largely upon the experience of an operator. Many grinding iterations are often required to achieve a desirable result.

On most CNC cylindrical grinders used today, the grinding wheel moves horizontally with the feed velocity (infeed and retraction) synchronized with the workpiece rotational speed to achieve the required tool path. If the workpiece is rotated with a constant workpiece rotational speed, drastic changes of the instantaneous grinding conditions occur during a revolution of the workpiece due to its non-circular geometry. Therefore, the instantaneous workpiece rotational speed of the workpiece is suitably varied during a revolution of the workpiece to control and to reduce the effect of the changes in instantaneous grinding conditions.

Different strategies have been proposed for optimizing cam lobe grinding methods. Such strategies include constant stock removal rate or constant spindle power, both of which are commonly used in the industry today.

U.S. Pat. No. 6,808,438 B1 discloses a method in which the component is rotated through only one revolution during a finish grinding step and the depth of cut and the headstock velocity are controlled during the single rotation so as to maintain a substantially constant load on the grinding wheel spindle drive motor. The component speed is altered from one point to another during each revolution so as to maintain the constant load.

U.S. Pat. No. 7,153,194 B2 discloses a method of grinding a component, such as a cam, comprising rotating the component through only a single revolution during a final grinding step and controlling the depth of cut and the component speed of rotation during the single revolution, so as to maintain a substantially constant specific metal removal rate during the final grinding step. The depth of cut can be kept constant whereas the workpiece speed of rotation is altered during the final grinding step to accommodate any non-rotational features of a workpiece so as to maintain the constant specific removal rate.

The above described methods improve productivity compared to conventional grinding with constant workpiece rotational speed of the workpiece. However, grinding methods which achieves a constant stock removal rate or a constant spindle power do not consider workpiece surface temperature. Therefore, none of them provide any means for controlling thermal damage, which is one of the main limitations of the grinding method in terms of productivity and quality. In cases where thermal damage occurs, the general strategy by process planners has been to either decrease the wheel feed increment or to reduce the workpiece rotational speed, both of which will result in a grinding method which is not fully optimized, yielding cycle times longer than necessary. The process planners use the above described optimizations methods only to calculate the workpiece rotational speed for achieving constant stock removal rate or constant spindle power. However, the determination of number of increments and the depth of cut for each increment are still based on trial and error and selected subjectively by machine operators.

A new strategy for optimizing peripheral cylindrical grinding of non-circular workpieces was proposed by Krajnik et al., "*Optimization of peripheral non-round cylindrical grinding via an adaptable constant-temperature process*", CIRP Annals—Manufacturing Technology 62 (2013) 347-350. In accordance with this strategy, the grinding is optimized by choosing process parameters based on a thermal model for achieving a constant maximum surface temperature of the workpiece with the purpose of reducing the grinding cycle time while avoiding thermal damage of the workpiece.

Krajnik et al., "*Cycle optimization in cam-lobe grinding for high productivity*", CIRP Annals—Manufacturing Technology, available online 13 Apr. 2014, discloses further developments as to the strategy of optimizing a grinding process based on a thermal model. This article discloses for example that considerably lower grinding times per cam lobe compared to the processes of constant stock removal and constant spindle power can be achieved. It also discloses that the instantaneous specific energy into the workpiece depends on the aggressiveness number. Furthermore, the article discloses that minimizing the grinding time per cam lobe of the grinding method requires employing the optimal number of feed increments, which depends on the set temperature and the machine limitations.

While it is clear that the proposed strategy of controlling the process parameters with the purpose of maintaining a constant maximum surface temperature of the workpiece overcomes the problems associated with thermal damage, it is not clear how the strategy can be industrially implemented. Moreover, the grinding method using the proposed strategy of controlling the process parameters with the purpose of maintaining a constant maximum surface temperature of the workpiece does not necessarily result in an acceptable quality of the workpiece after grinding. In fact, it is not taught how to control the quality of the surface of the workpiece. Further development is therefore needed.

SUMMARY OF THE INVENTION

The object of the present invention is to be able to provide a grinding method of a workpiece, such as a non-circular workpiece, resulting in a high productivity and consistent quality of the workpiece and which grinding method can be industrially implemented. In order to be able to have a robust method with full control over the quality of the workpiece, the subjective role of operators or process planners has to be removed, or at least minimized.

The object is achieved by the grinding method according to independent claim 1 and the method for determining processing parameters of a grinding method according to claim 10. Embodiments are defined by the dependent claims.

The present grinding method results in considerably higher productivity resulting from lower total grinding times compared to grinding methods optimized by controlling the process parameters so as to maintain a constant stock removal rate or a constant spindle power while obtaining the desired resulting surface quality of the workpiece. Furthermore, it eliminates the risk of thermal damage of the workpiece during the grinding method. Furthermore, the present invention results in a robust grinding method with full control of the quality of the workpiece. Thereby, it is not necessary to compromise between productivity and quality when using the present method. Also, it eliminates the subjective role of machine operators in grinding cycle design, thereby making the process more robust as the processing parameters can be determined before start of grinding.

The present grinding method is based on the strategy of controlling the grinding method with the purpose of maintaining a pre-selected maximum surface temperature of the workpiece, said temperature being below the thermal damage threshold temperature of the material of the workpiece, and is controlled such that said strategy is employed during as much as possible of the grinding cycle. The grinding method comprises a first stage adapted for removing most of the stock to be removed from the workpiece, a so called roughing stage, and a second stage adapted to obtain the final intended geometry of the workpiece with the intended quality, a so called finishing stage. Both stages are based on the theory of controlling the process parameters so as to maintain an essentially constant surface temperature of the workpiece. However, the processing parameters of the grinding method is in reality only controlled such that the surface temperature of the workpiece is controlled in the first stage, and the second stage is conducted using the same workpiece rotational speed profile as in the first stage but with a lower depth of cut resulting in a lower aggressiveness and consequently lower surface temperature of the workpiece in the second stage. More specifically, the aggressiveness number in the second stage is controlled which means that the surface temperature of the workpiece is controlled indirectly. Since the aggressiveness number used in the second stage will always be lower than the aggressiveness number used in the first stage (because it is used for targeting the experimentally determined grinding sweet-spot), the surface temperature of the workpiece will also be lower in the second stage.

While the grinding method is controlled to maintain an essentially constant surface temperature of the workpiece during each stage of the grinding method, in reality the process is subject to machine limitations. These machine limitations may result in reduced surface temperature for some angles of rotation depending on the geometry of the workpiece (which is also shown in Krajnik et al., "*Cycle optimization in cam-lobe grinding for high productivity*", CIRP Annals—Manufacturing Technology, available online 13 Apr. 2014). However, as the grinding method is controlled to a maximum surface temperature, said temperature is never exceeded and consequently there is no risk for thermal damage during the grinding.

Furthermore, compared to grinding methods controlled to achieve a constant stock removal rate or a constant spindle power, the grinding method according to the present disclosure is able to utilize higher stock removal rates for the same geometry, especially in a non-circular section of the workpiece.

The present grinding method is mainly developed for grinding of an axially extending surface of workpieces having a non-circular cross section by means of an essentially rotationally symmetrical grinding wheel, but can also be used for grinding of workpieces having a circular cross section, i.e. circular cylindrical workpieces. The grinding method and the method for determining processing parameters of a grinding method is highly suitable for use when grinding for example cam lobes as these often have a complex geometry. Examples of other non-circular workpieces may for example include workpieces having a cross-sectional shape of a square, rectangle, oval or the like as well as irregular shapes. The present grinding method can in fact be used when grinding a workpiece with an arbitrary geometrical cross section.

In comparison to the strategy disclosed in Krajnik et. al, "*Optimization of peripheral non-round cylindrical grinding via an adaptable constant-temperature process*", CIRP Annals—Manufacturing Technology 62 (2013) 347-350, and Krajnik et al., "*Cycle optimization in cam-lobe grinding for high productivity*", CIRP Annals—Manufacturing Technology, Available online 13 Apr. 2014, the present grinding method is not only controlled so as to maintain a constant maximum surface temperature, but is also divided into two separate stages which are interrelated. In both stages of the grinding method, the process parameters are controlled based on the strategy of controlling the method so as to maintain a constant surface temperature of the workpiece. However, the two stages are adapted for achieving different purposes, the first stage mainly targeting the highest productivity rate possible and the second stage mainly targeting the highest quality of the resulting workpiece. In fact, the grinding method according to the present disclosure is developed to control the pre-selected maximum surface temperature during the first grinding stage while in the second grinding stage, the method is controlled to achieve the desired surface quality of the workpiece by controlling the aggressiveness number. However, both stages of the grinding method utilizes the same workpiece rotational speed. Moreover, the present grinding method is developed not only to divide grinding into two separate stages, that is a roughing stage and a finishing stage, but also how the respective stages are optimized in relation to each other to achieve the shortest grinding cycle times with the desired consistent resulting quality of the workpiece after grinding. The present method also enables determining the stock removal of each of the first and the second stage, respectively, so as to fully optimize the grinding method.

According to an aspect of the present invention, the method of grinding a workpiece, such as a non-circular workpiece, which is rotated around a rotational axis, by means of an essentially rotational symmetrical grinding wheel is provided and comprises grinding the workpiece in a first stage and a second stage, wherein the workpiece rotational speed profile in said first stage is controlled with the purpose of maintaining a pre-selected maximum surface temperature of the workpiece during said first stage, that the workpiece rotational speed profile of the workpiece in the second stage is controlled to be the same as the workpiece rotational speed profile of the workpiece in the first stage, and wherein grinding of the workpiece in said second stage is performed by controlling an aggressiveness number of said second stage so as to achieve an intended final surface quality by a pre-selected number of increments in said second stage.

For practical reasons, it is preferred that the depth of cut during the first stage is kept constant for each revolution of the workpiece. Furthermore, it is preferred that the depth of cut is kept constant for each revolution of the workpiece during the second stage.

The aggressiveness number in the second stage may suitably be controlled by controlling the depth of cut is said second stage. Controlling the aggressiveness number by controlling the depth of cut is much easier than for example controlling the wheel speed to achieve the same purpose.

The depth of cut and the number of increments in the first stage may suitably be controlled so as to minimized the grinding time based on the pre-selected maximum surface temperature of the workpiece and the calculated workpiece rotational speed profile.

The workpiece rotational speed profile for the first stage and the second stage, the number of increments in the first stage, the depth of cut for each increment during the first stage and the depth of cut for each increment in the second stage may suitably be determined by iterating the first and second stage using the pre-selected maximum surface temperature of the workpiece for the first stage, a pre-selected desired number of increments during the second stage and an experimentally determined aggressiveness number for achieving the grinding sweet-spot.

The present grinding method may be used on a cylindrical grinding machine wherein the grinding wheel is adapted to rotate around a rotational axis which is essentially parallel to the rotational axis of the workpiece and hence the head stock of the grinding machine.

In order to easily control the grinding method in view of machine dynamics, the rotational speed of the grinding wheel may suitably be the same for the first and for the second stage. Thus, the relative speed between the workpiece and the grinding wheel are controlled by controlling the instantaneous workpiece rotational speed.

According to an aspect of the present invention, a method of determining processing parameters of a grinding method as disclosed above is provided. The method of determining the processing parameters comprises iterating the first and the second stage of the grinding method by the following steps:

selecting the total stock to be removed from the workpiece as the stock removed in the first stage;

calculating a number of increments in the first stage with a corresponding depth of cut for each increment in the first stage for achieving the stock removed in the first stage while controlling the instantaneous workpiece rotational speed with the purpose of maintaining a pre-selected maximum surface temperature of the workpiece;

calculating the grinding cycle time resulting from the number of increments in the first stage and the instantaneous workpiece rotational speed obtained in step b;

in case the grinding cycle time obtained in step c is equal to or less a grinding time which would be achieved for a grinding cycle comprising one less increment in the first stage, repeating steps b and c for a grinding cycle comprising one additional increment until the grinding time obtained is greater than a grinding time for a grinding cycle comprising one less increment, thereby obtaining a calculated instantaneous workpiece rotational speed for the first stage, a calculated number of increments for the first stage and a calculated depth of cut for each increment in the first stage;

calculating the stock removal of the second stage using the calculated instantaneous workpiece rotational speed obtained from step d, a pre-selected number of increments in the second stage and a pre-identified aggressiveness number of the second stage corresponding to a depth of cut during the second stage;

calculating the stock removal in the first stage by subtracting the stock removal in the second stage from the total stock to be removed from the workpiece;

repeating steps b to f using the stock removal of first stage obtained in step f until the same stock removal for the first stage is achieved in step f as in the previous iteration of the first and the second stage;

thereby determining the instantaneous workpiece rotational speed, the number of increments in the first stage ($n_1$), the depth of cut ($a_{e1}$) in each increment in the first stage and the depth of cut ($a_{e2}$) in each increment in the second stage.

The determined instantaneous workpiece rotational speed, the number of increments in the first stage ($n_1$), the depth of cut ($a_{e1}$) in each increment in the first stage and the depth of cut ($a_{e2}$) in each increment in the second stage may then be programmed into an electronic control unit of a grinding machine such that the electronic control unit can control the operation of the grinding machine to achieve the grinding method as disclosed above. In view of the fact that the process parameters can be determined as described above, an operator of the grinding machine need not rely on his experience or multiple tests to optimize the grinding method. Thus, a high productivity with a desired quality of the resulting workpiece can easily be obtained.

The iterations disclosed above are preferably made using a constant wheel speed of the grinding wheel for the first and second stage, i.e. the wheel speed during the total grinding cycle comprising the first and the second stage is preferably constant.

The iterations disclosed above are preferably made using a constant depth of cut for each increment during the first stage. The iterations disclosed above are preferably made using a constant depth of cut for each increment during the second stage. However, the depth of cut during the second stage is preferably less than the depth of cut during the first stage.

According to an aspect of the present invention, a computer program for determining processing parameters of a grinding method is provided, which computer program comprises program code for performing the method steps of the method for determining processing parameters as disclosed above.

According to an aspect of the present invention, a computer program for determining processing parameters of a grinding method is provided, which computer program comprises program code stored on a computer-readable medium for performing the method steps of the method for determining processing parameters as disclosed above.

The computer program may further be arranged to provide the determined processing parameters to an electronic control unit or another computer connected to or adapted to communicate with the electronic control unit.

The electronic control unit can for example be an electronic control unit of a grinding machine adapted to control parameters such as the grinding wheel speed, the infeed of the grinding wheel and the instantaneous rotational speed of the head stock adapted to rotate the workpiece, as well as the number of increments.

According to an aspect of the present invention, a computer program product is provided containing a program code stored on a computer readable medium for performing the method of determining processing parameters of a grinding method as disclosed above when said computer program is run on an electronic control unit or another computer connected to or adapted to communicate with the electronic control unit.

BRIEF DESCRIPTION OF DRAWINGS

Below are descriptions of example embodiments of the invention, with reference to the enclosed drawings, in which.

DETAILED DESCRIPTION OF THE INVENTION

In the following, the grinding method will be described in more detail with reference to the drawings. However, the grinding method is not limited to the embodiments disclosed and discussed but may be varied with the scope of the appended claims. Furthermore, the drawings shall not be considered drawn to scale as some features may be exaggerated in order to more clearly illustrate the features.

The present invention relates to grinding of an axially extending radial outer surface of workpieces. Even though it may be used on a workpiece having any kind of shape, for example a circular cross section, it is mainly developed for grinding of workpiece which contain a non-circular cross-section, i.e. components which are not circular cylindrical in shape. In this context, a non-circular cross section means that the radius of the workpiece varies between different rotational angles of the workpiece. The workpiece may however have a portion which is circular and thus have a constant radius in said portion, but the workpiece comprises at least one portion which has a radius other than a radius of another portion. The geometry of the workpiece is thus non-rotationally symmetrical. These types of workpiece geometries are often referred to as non-round in the art.

Figure 1:
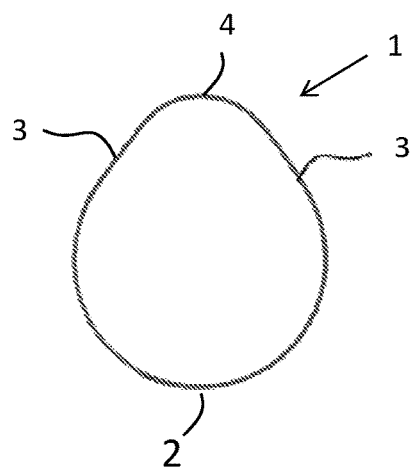
FIG. 1 schematically illustrates a cross sectional view of a cam lobe.

FIG. 1 illustrates a cross sectional view of one example of such a workpiece, having a non-circular cross section, in the form of a cam lobe 1. In the illustrated example, the cam lobe 1 comprises a base circle portion at the heel 2, two flank portions 3 and a nose portion 4. In the base circle portion, the radius is constant. However, the flank portion 3 has a different radius than the base circle portion and may even be essentially straight or concave in nature. The geometrical cross-sectional shape of a cam lobe can be much more complex than the one illustrated in the example. For example, it may comprise more than one nose portion or may comprise a re-entrant portion.

Figure 2:
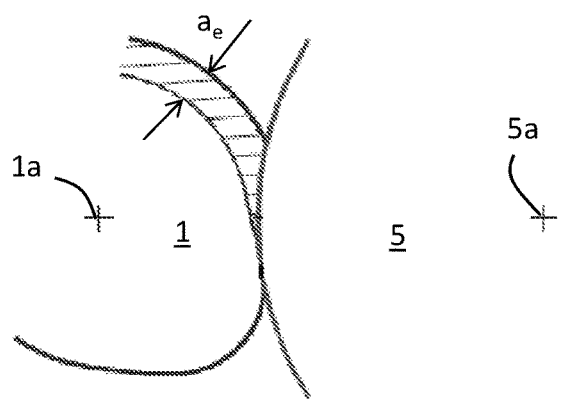
FIG. 2 schematically illustrates a cross sectional view of a cam lobe and a grinding wheel during a grinding method.

FIG. 2 schematically illustrates a cross-sectional view of a part of a grinding wheel 5 and a part of cam lobe 1 during grinding. In the illustrated example, the rotational axis of the workpiece $1a$ is parallel to the rotational axis $5a$ of the grinding wheel 5, and the workpiece and the grinding wheel are rotated in relation to each other in opposite directions. By means of the rotation of the workpiece the grinding wheel can be controlled with a horizontal infeed and need not be rotated around the workpiece. The infeed of the grinding wheel is regulated to the depth of cut $a_e$ as shown in the figure.

Even though FIG. 2 illustrates an example wherein grinding is performed by the radial periphery of the grinding wheel, it may also be performed using the wheel side face without departing from the present invention.

In accordance with the present grinding method, the instantaneous workpiece rotational speed is controlled to achieve a specific purpose, i.e. a constant maximum surface temperature of the workpiece during the first grinding stage. The workpiece rotational speed is the same for all revolutions of the workpiece, i.e. for all increments, but varies instantaneous within a particular revolution to accommodate for the changing geometry of the contact zone between the workpiece and the grinding wheel. This means that the workpiece rotational speed is different between one point and another during a single revolution of the workpiece. An instantaneous workpiece rotational speed thus relates to a workpiece rotational speed in one specific point and accommodates for the differences in grinding conditions during the grinding method. The instantaneous workpiece rotational speed for each rotational angle of the workpiece thus forms a workpiece rotational speed profile.

Furthermore, in accordance with the present grinding method the instantaneous workpiece rotational speed is the same in the first stage as in the second stage. This is considered to mean that the workpiece rotational speed will be essentially the same for the same rotational angle of the workpiece when in contact with the grinding wheel. That is, when a specific point of the workpiece passes the grinding wheel, the workpiece rotational speed will be the same in each revolution. Thus, the workpiece rotational speed profile will be the same in the first and in the second stage of the grinding method.

Even though the second grinding stage is performed using the same workpiece rotational speed, grinding is performed while controlling the aggressiveness number to target the grinding sweet spot. The aggressiveness number in the second stage will hence be lower than the aggressiveness number of the first stage, since the main purpose of the first stage is to remove as much stock as possible at the shortest possible time while avoiding the risk for thermal damage of the workpiece. Since the second stage is performed using the same strategy of maintaining a constant surface temperature, while the aggressiveness number is lower, the surface temperature of the workpiece will also be lower in the second stage compared to the first stage. Thus, there is no risk for thermal damage of the workpiece.

In accordance with the present grinding method, the aggressiveness number of the second stage is controlled so as to target the grinding sweet spot. It is preferred that the aggressiveness number is controlled by controlling the depth of cut in the second stage as will be described further below. It is critical that an appropriate aggressiveness number is selected in the second stage for achieving the desired resulting quality. For example, if a too low depth of cut during the second stage would be used, which could shift the aggressiveness below the sweet spot, then the specific energy into the material could risk being too high which in turn could result in thermal damage of the material and consequently inferior quality (in turn resulting in reduced productivity as the quality of workpieces would not be acceptable). This could for example be a risk in a grinding method wherein room is left for an operator or a process planer to use his experience to determine any process parameters. Considering a hypothetical case wherein a grinding method would use a roughing stage wherein the constant temperature strategy proposed by Krajnik et al. would be used, followed by a finishing stage which would be subject to design by an operator or a process planner, such a grinding method would not yield a repeatable and consistent quality of the workpiece and could result in a loss of productivity compared to the present invention. It may also be subject to a risk for thermal damage in case a too low depth of cut would be selected by the operator as described above. However, in accordance with the present method of grinding and the present method for determining the processing parameters, the subjective role of an operator of a process planner is removed. Therefore, the present invention ensures that the same consistent desired quality is achieved.

In view of the fact that the aggressiveness number in the second stage of the grinding method is controlled so as to target the intended surface quality, i.e. the grinding sweet spot, the present grinding method guarantees a robust and highly-capable and reproducible process. This is due to the grinding always being performed in or close to a sweet spot resulting in a very small deviation in the surface quality of the workpiece. This in turn leads to an very high process capability index (cpk).

The grinding method disclosed herein is performed by grinding of a workpiece as disclosed above. Thus, it relates to the grinding of an outer peripheral surface of a workpiece wherein the workpiece is rotated around a rotational axis by means of a head stock. The grinding wheel is rotated around a rotational axis which for example may be essentially parallel to the rotational axis of the workpiece. The process is divided into two separate, however interrelated, stages, wherein the first stage is adapted to remove most of the stock to be removed from the workpiece while targeting the highest possible productivity and the second stage is adapted to remove only a small portion of the total stock removal and adapted to target the intended surface quality of the workpiece, e.g. the surface roughness.

In the following, the theoretical considerations behind the controlling of the grinding method will be described. The science is based on the information given in Krajnik et al., "Cycle optimization in cam-lobe grinding for high productivity", CIRP Annals—Manufacturing Technology, available online 13 Apr. 2014, which is hereby incorporated in its entirety by reference. Krajnik et. al does however not disclose the use of a first and a second stage of the grinding process, and how each of these stages should be controlled.

In view of the complex geometrical shape of the workpiece, the peripheral form of the workpiece has to be determined and may suitably be defined as a continuous function. In practice, the geometry can be determined using a lift table via the follower center path around the circumference of the workpiece. The discrete data points used consists of two-variable couples including the follower center angle and the distance between the workpiece and the follower centers defined for every degree of workpiece rotation angle. Thereby, 360 input parameters can be used for modeling the geometry.

During grinding, the geometry of the contact zone of the workpiece and the grinding wheel changes with the angle of rotation of the workpiece due to its non-circular form. The geometry of the contact zone may be expressed in terms of instantaneous contact length expressed as:

$$l_{c,i} = \sqrt{\frac{2R_{0,i}r_s}{R_{0,i}+r_s}a_e}$$

wherein $r_s$ is the radius of the grinding wheel and $a_e$ is the depth of cut.

Considering that the depth of cut $a_e$ is constant for every feed increment in one stage of the grinding method, it can in practice be calculated by dividing the total stock removal $\delta$ in said stage by the number of feed increments n, which is simply the number of workpiece revolutions to reach the intended workpiece form for the stage of grinding method. The radius of the workpiece curvature $R_{0,i}$ is used for circular approximation of the workpiece geometry in each i-th contact point.

A major parameter of grinding kinematics is the instantaneous relative workpiece velocity $v_{w,i}$ defined as:

$$v_{w,i} = \frac{R_{0,i}d_{ws,i}}{(R_{0,i}+r_s)\cos\psi_{0,i}}\omega_i$$

where $d_{ws,i}$ is the distance between rotational centers of the grinding wheel and the workpiece, $\psi_{0,i}$ is the angle of contact, and $\omega_i$ is the workpiece angular speed. The resulting instantaneous specific stock removal rate $Q'_{w,i}$ can then be calculated as:

$$Q'_{w,i}=a_e v_{w,i}$$

Thermal modeling (based upon moving heat-source theory with triangular heat flux) is adapted to grinding of non-circular workpiece, with the maximum surface temperature $\theta_{m,i}$.

$$\theta_{m,i} = \frac{1.064}{\sqrt{k\rho c_p}}e_w(aggr_i)\frac{Q'_{w,i}}{\sqrt{l_{c,i}v_{w,i}}}$$

where k is the thermal conductivity, $\rho$ the density, $c_p$ the specific heat of the workpiece material. The instantaneous specific energy into the workpiece $e_w$ depends on the aggressiveness number $aggr_i$ (reference can also be made to Badger, "Factors Affecting Wheel Collapse in Grinding", CIRP Annals—Manufacturing Technology, 58(1), 2009, p. 307-310, hereby incorporated by reference):

$$aggr_i = \frac{C_{aggr}Q'_{w,i}}{v_s l_{c,i}}$$

Since values of $aggr_i$ are small, a constant $C_{aggr}$ may suitably be used in production to give more practical values. Using a $C_{aggr}$ of $10^6$ gives more practical values, typically in the order of 10 to 120.

The aggressiveness number aggr is non-dimensional and is proportional to the maximum chip thickness. However, it avoids estimating cutting point density and chip-shape factor, which often are difficult to identify. Furthermore, it has the advantage of only being dependent of parameters which can be altered on a machine used for the grinding method (e.g. the grinding wheel speed $v_s$). Therefore, the aggressiveness number is suitable for use in industrial implementation. The characteristic curve for the specific energy $e_w$ is given in terms of aggressiveness number $aggr_i$:

$$e_w(aggr_i) = e_{w0} + \frac{C_w}{aggr_i^\mu}$$

wherein $e_{w0}$ is the invariable amount of specific energy into the workpiece, $C_w$ is a constant and p is the exponent. These values and hence the characteristic curve for the specific energy into the workpiece are determined experimentally and depend on the material of the workpiece as well as the grinding wheel used. Krajnik et al, "*Optimization of peripheral non-round cylindrical grinding via an adaptable constant-temperature process*", CIRP Annals—Manufacturing Technology 62 (2013) 347-350 discloses how to perform such an experimental test and it will thus not be described further in the present disclosure. The characteristic curve for the specific energy facilitates to identify the grinding sweet spot and hence the aggressiveness number suitable for the second stage of the grinding method.

Figure 4:
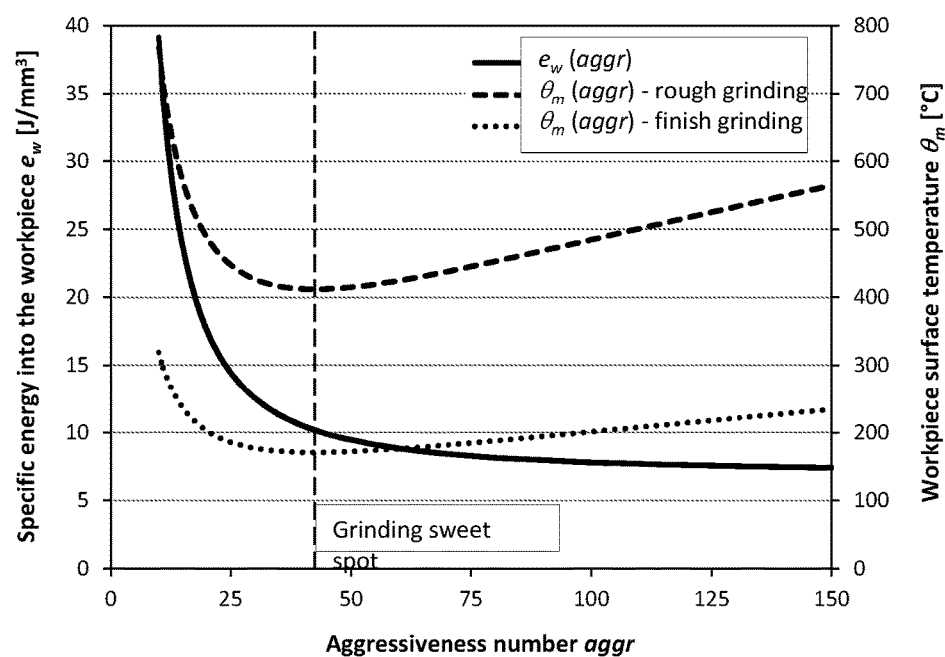
FIG. 4 illustrates one example of a characteristic curve for the specific energy into the workpiece and workpiece surface temperature profiles for the first and the second stage of the grinding method versus the corresponding aggressiveness number.

The experimentally determined characteristic curve of the specific energy into the workpiece is used to identify the grinding sweet spot and hence the aggressiveness number for the second stage of the grinding method. Based on this characteristic curve, the grinding sweet spot aggressiveness number $aggr_{gss}$ is calculated as:

$$aggr_{gss} = \left(\frac{C_w(2\mu - 1)}{e_{w0}}\right)^{1/\mu}$$

giving the workpiece surface temperature a minimum value, regardless of the used depth of cut (as shown in FIG. 4).

The experimental test for determining the characteristic curve of the specific energy into the workpiece is the only experimental test needed in order to precisely calibrate the grinding method in accordance with the present grinding method. Such an experimental test need only be made once for each combination of a material of a workpiece and a selected grinding wheel. Thus, the operator of a machine need not rely on his experience to further design the grinding method in order to optimize it, but can use the result of iterations as will be described further below to operate the grinding machine.

The calculation of the constant set surface temperature of the workpiece $\theta^*$ is given by $$\theta^* = 1.064\sqrt{\frac{v_s\delta}{C_{aggr}k\rho c_p}}\, e_w(aggr^*)\sqrt{\frac{aggr^*}{n}}$$

where $aggr^* = aggr^*(\theta^*, n)$ is the aggressiveness number needed to maintain the set surface temperature of the workpiece $\theta^*$. Based on the definition of the aggressiveness number given above, the workpiece angular speed $\omega_i$ to achieve $\theta^*$ can be calculated as:

$$\omega_i = \frac{v_s\cos\psi_{0,i}}{C_{aggr}d_{ws,i}}\sqrt{\frac{2r_s(R_{0,i} + r_s)}{R_{0,i}\delta}}\, aggr^*\sqrt{n}$$

with a corresponding workpiece rotational speed of $n_{w,i} = 30\omega_i/\pi$. This speed is ideal, and does not take into account machine limitations. It is apparent to the skilled person that in actual production, the achievement of $n_{w,i}$ is subject to several machine limitations related to the headstock (including maximal angular speed $\omega_{max}$, maximal angular acceleration $\alpha_{max}$, and maximal angular jerk $j_{max}$) and the wheel head (maximum infeed $v_{fa,max}$, maximum acceleration $\alpha_{fa,max}$ and maximum jerk $j_{fa,max}$). Jerk limits the rate of change in acceleration and smoothes a speed profile.

Furthermore, in view of the machine limitations, even though grinding in the first stage of the present grinding method is controlled with the purpose of maintaining a constant set maximum surface temperature, the surface temperature of the workpiece will likely be lower than the set temperature during a small portion of the revolution of the workpiece. However, it can never be higher than the set maximum surface temperature and there is consequently no risk of thermal damage of the workpiece.

Even though a strategy of controlling the grinding so as to maintain a set maximum surface temperature of the workpiece for the whole grinding cycle would give a short cycle time and thus a high productivity, the surface quality of the workpiece would likely not be acceptable for many applications of the workpiece. Therefore, it is necessary to perform the grinding in two stages, a first grinding stage adapted to remove most of the stock and a second stage adapted to achieve the desired finishing quality of the workpiece. Consequently, the present grinding method is developed to comprise two grinding stages, a roughening stage and a finishing stage. It is previously known to perform grinding in two stages with the grinding methods adapted to maintain a constant stock removal rate or a constant spindle power. However, as previously disclosed, these methods do not take into account the surface temperature of the workpiece. Furthermore, these prior art methods does not take into account an optimization of the number of increments (and a corresponding depth of cut in each increment). Hence, the prior art methods are not fully optimized and the grinding cycle is subject to a certain amount of cycle design by an operator. In contrast, the present grinding method is fully robust and does not rely on the experience of an operator but enables the optimum number of increments to be determined without trial and error tests. The grinding method can be optimized by determining an optimal number of increments, a parameter which is often overlooked when designing grinding cycles according to prior art. The processing parameters are determined by the method for determining the processing parameters as will be disclosed further below. The present grinding method also overcomes the problems associated with thermal damage and results in high productivity as well as quality of the workpiece.

The first grinding stage of the present grinding method is controlled with the purpose so as to maintain a pre-selected (set) maximum surface temperature of the workpiece. This pre-selected maximum surface temperature is set based on the properties of the material of the workpiece and naturally below the thermal damage threshold of the material (typically associated with the tempering temperature of the workpiece material). Controlling the grinding in the first stage with the purpose of maintaining a pre-selected maximum surface temperature is achieved by controlling the instantaneous workpiece rotational speed during each revolution of the workpiece. The depth of cut during each revolution of the workpiece, i.e. each increment, is constant during each increment and between different increments during the first grinding stage.

In theory, it would be possible to include a third stage between the first and the second stage, said third stage being performed with a lower aggressiveness than the first stage but higher than the aggressiveness of the second stage. However, such a process would be very difficult to implement as the number of increments for each stage is to be determined and optimized in order to achieve the highest possible productivity in the total grinding cycle as well as the quality of the workpiece. Therefore, it is not practical to include additional stages after the first stage and before the second stage of the grinding method.

The second grinding stage of the present grinding method is adapted to target the grinding sweet spot and the aggressiveness number for the second stage is consequently selected accordingly. During the second grinding stage, the instantaneous workpiece rotational speed is selected to be the same as in the first grinding stage. Even though it in theory would be possible to achieve the same desired result by optimizing the process from a different perspective than keeping the instantaneous workpiece rotational speed the same in the first grinding stage as the second grinding stage, this is the only practical solution from a machine perspective as conventional CNC systems of grinding machines are designed to utilize the same workpiece rotational speed for each increment. In accordance with the present grinding method, the reduced aggressiveness number for the second stage compared to the first stage is achieved by reducing the depth of cut in the second stage compared to the first stage such as to achieve the desired aggressiveness number for targeting the grinding sweet spot. The reduced aggressiveness number in the second stage could alternatively be achieved by altering the grinding wheel rotational speed. However, this would in practice be very difficult as the grinding method is a very fast process and grinding machines have certain limitations. Therefore, in order to be able to industrially implement the grinding method, the grinding wheel rotational speed is kept constant for the first and second grinding stages.

Minimizing the total grinding time per each workpiece by means of the present grinding method can be achieved by using an optimal number of feed increments. Said optimal number of feed increments depends on the pre-selected maximum surface temperature and the machine limitations of the machine used to perform the grinding. For example, the optimal number of increments for the first grinding stage decreases with increasing set maximum surface temperature. The optimal number of increments also depends on the geometry of the workpiece. For this reason, the number of feed increments is determined for each specific case, i.e. for each combination of the workpiece which is to be grinded as well as the grinding wheel used. As will be described below, it is possible to determine the number of feed increments by iteration of the two grinding stages based on the theory given above.

Figure 3:
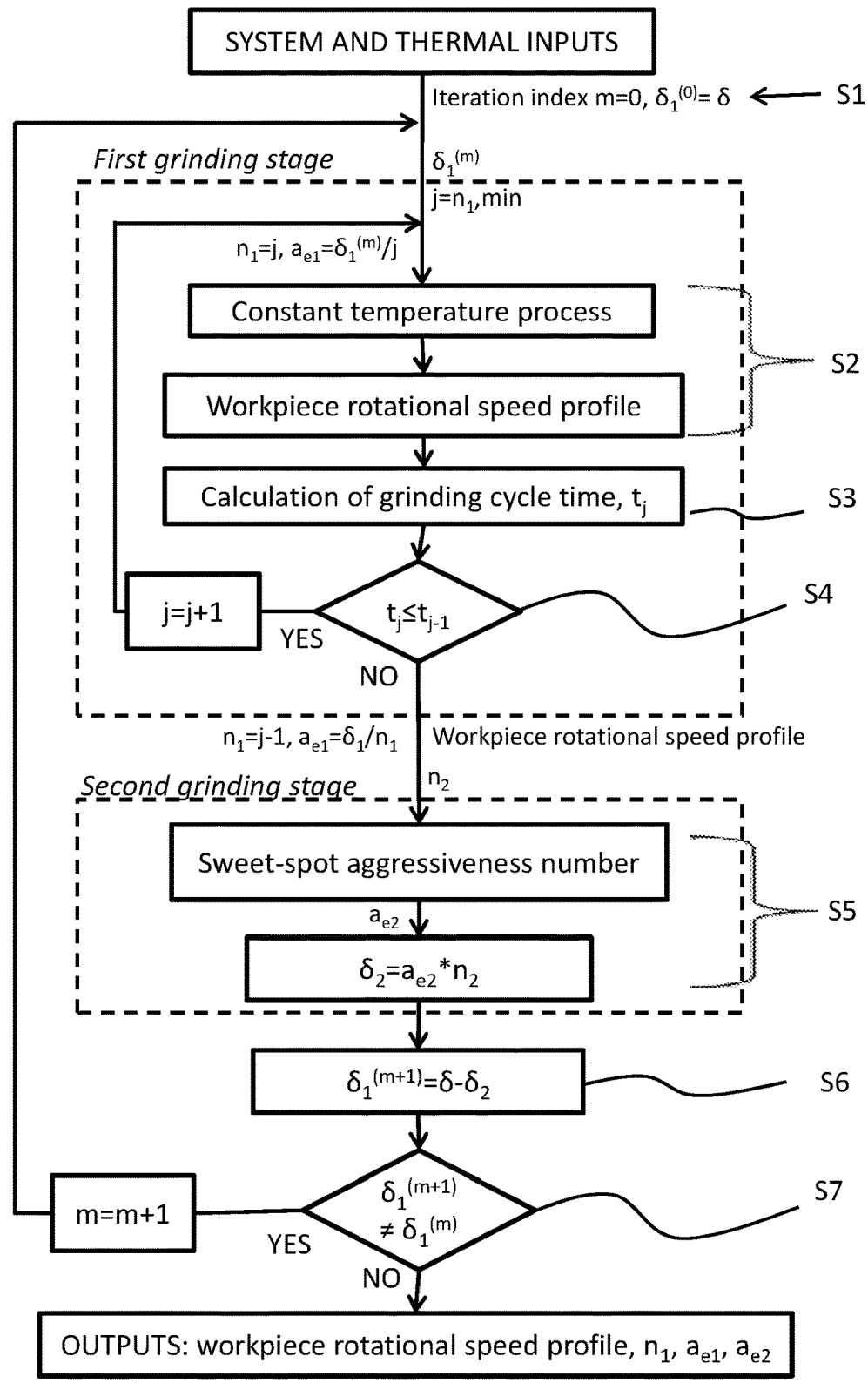
FIG. 3 schematically illustrates a flow chart of the optimization algorithm showing an iteration of the first and the second stage of the grinding method.

In practice, the parameters of the grinding method can be determined by iterating the first stage and the second stage of the grinding method as disclosed below with reference to the flow chart shown in FIG. 3.

Before starting the iteration of the first and second stage of the grinding method, the desired maximum surface temperature of the workpiece is selected. Such a maximum temperature is set below the thermal threshold of the material of the workpiece. Furthermore, the characteristic curve for the specific energy into the workpiece is experimentally determined and the grinding sweet spot is determined from said curve, thereby giving the aggressiveness number for the second stage. Moreover, the desired number of finishing increments is selected. Usually, the number of finishing increments, i.e. the number of increments in the second stage, would be one, two or three for practical reasons. It should be noted that the stock removal in the respective stages is not pre-selected but will be determined by the iteration of the first and second stages such as to provide the highest productivity while achieving the desired quality of the workpiece after grinding.

Then, the process parameters of the first and second stage are determined by iteration, iterating the first and second stage of the grinding method.

In the initial iteration (iteration index m=0), the total stock to be removed $\delta$ (INPUT) from the workpiece during the grinding cycle is taken as the stock removed in the first stage $\delta_1^{(0)}$.

Iteration of the first stage of the grinding method is then conducted based on the strategy of a pre-selected constant maximum surface temperature of the workpiece in order to minimize the time for the total grinding cycle. More specifically, the number of increments $n_i$ (OUTPUT) and corresponding depth of cut $a_{e1}$ (OUTPUT) for the first stage are calculated in order to achieve a minimum grinding time, while controlling the instantaneous workpiece rotational speed during each revolution of the workpiece (OUTPUT) (i.e. the workpiece rotational speed profile) with the purpose to maintain a constant pre-selected maximum surface temperature (INPUT).

Thereafter, the grinding time cycle for the first stage $t_j$ is calculated for the number of increments in the first stage $n_i$=j, and if being equal to or less than a grinding time for a case of one less increment $t_{j-1}$, the iteration for the first stage is repeated using one additional increment. In case the calculated grinding time for j increments is not equal to or less than the grinding time for j-1 increments, the second stage of the grinding method is iterated.

The workpiece rotational speed calculated by the iteration of the first grinding stage is then used for calculating the depth of cut for the second stage $a_{e2}$ (OUTPUT) of the grinding method necessary to achieve the pre-selected sweet-spot aggressiveness number (INPUT). Thus, the second stage of the grinding method is adapted to be performed under the condition of using the same instantaneous workpiece rotational speed as the first stage of the grinding method.

Here it can be noted that the aggressiveness number associated with the sweet spot is always lower that the aggressiveness number in the first stage. Therefore, the surface temperature of the workpiece will always be lower in the second stage than in the first stage.

Then, based on the preselected number of increments in the second stage and the calculated depth of cut for the second stage $a_{e2}$, the total stock removal for the second stage $\delta_2$ is determined.

Based on the $\delta_2$ value obtained, the stock removal for the first stage $\delta_1$ is determined by subtraction of $\delta_2$ from total stock removal $\delta$.

The iteration of the first grinding stage and the second grinding stage are then repeated until the obtained $\delta_1$ for the (m+1)-th iteration corresponds to $\delta_1$ of the m-th iteration.

In view of the fact that the number of increments must always be an integer (as the whole surface of the workpiece is to be grinded), the iterative method is terminated when in the (m+1)-th iteration, the same number of increments for the first stage n1 is achieved as in the m-th iteration.

FIG. 4 illustrates an example of a characteristic curve for the specific energy into the workpiece, which in this case was a cam lobe. The result shown in FIG. 4 was obtained for a CBN wheel and a conventionally used material for a cam lobe. The curve is used for determining the grinding sweet spot and the corresponding aggressiveness number for the second stage of the grinding method (in this case about 40). Said aggressiveness number is then used for the iterations specified above. FIG. 4 also illustrates the workpiece surface temperature versus the aggressiveness number of the first stage and of the second stage.

Thus, a method for determining the processing parameters of the grinding method comprises iterating the first and the second stage of the grinding method by the following steps:

a. selecting the total stock to be removed ($\delta$) from the workpiece as the stock removed in the first stage ($\delta_1$) (S1);

b. calculating a number of increments in the first stage ($n_1$) with a corresponding depth of cut ($a_{e1}$) for each increment in the first stage for achieving the stock removed in the first stage ($\delta_1$) while controlling the instantaneous workpiece rotational speed with the purpose of maintaining a pre-selected maximum surface temperature ($\theta^*$) of the workpiece (S2);

c. calculating the grinding cycle time ($t_j$) resulting from the number of increments in the first stage ($n_1$) and the instantaneous workpiece rotational speed obtained in step b (S3);

d. in case the grinding cycle time ($t_j$) obtained in step c is equal to or less a grinding time ($t_{j-1}$) which would be achieved for a grinding cycle comprising one less increment in the first stage, repeating steps b and c for a grinding cycle comprising one additional increment until the grinding time obtained is greater than a grinding time for a grinding cycle comprising one less increment, thereby obtaining a calculated instantaneous workpiece rotational speed for the first stage, a calculated number of increments for the first stage ($n_1$) and a calculated depth of cut ($a_{e1}$) for each increment in the first stage (S4);

e. calculating the stock removal ($\delta_2$) of the second stage using the calculated instantaneous workpiece rotational speed obtained from step d, a pre-selected number of increments ($n_2$) in the second stage and a pre-identified aggressiveness number of the second stage corresponding to a depth of cut ($a_{e2}$) during the second stage (S5);

f. calculating the stock removal in the first stage ($\delta_1$) by subtracting the stock removal in the second stage ($\delta_2$) from the total stock removal ($\delta$) from the workpiece (S6); and g. repeating steps b to f using the stock removal of first stage ($\delta_1$) obtained in step f until the same stock removal ($\delta_1$) for the first stage is achieved in step f as in the previous iteration of the first and second stage (S7);

thereby determining the instantaneous workpiece rotational speed, the number of increments in the first stage ($n_1$), the depth of cut ($a_{e1}$) in each increment in the first stage and the depth of cut ($a_{e2}$) in each increment in the second stage.

The iterations above are suitably performed by a computer program comprising program code adapted to perform the iterations. The computer program could be run on a computer separate from the grinding machine and parameters obtained, i.e. the output, could be programmed into control means (adapted to control the grinding machine) of a conventional grinding machine. Alternatively, the parameters could be transferred by any conventional communication means and provided to a control means adapted to control the grinding machine. It is also possible to incorporate the computer program into a computer or an electronic control unit associated with a grinding machine, the electronic control unit adapted to control the operation of the grinding machine indirectly or directly.

Tests performed using the grinding method and the method for determining the processing parameters of a grinding method according to the present disclosure have shown that it is possible to increase the process productivity with about 30% to 50% when implemented compared to the previously known process of constant stock removal or constant spindle power using the same grinding machine. Furthermore, the present grinding method gives repeatable and consistent quality of the workpiece, which for example would not be possible in the case of a grinding method relying on grinding cycle design based on experience by an operator or process planner.

The grinding method is not limited to the specific embodiments described above but may be varied within the scope of the appended claims.

For example, the grinding method may optionally comprise a so called spark-out step if desired without departing from the scope of the present invention. In such spark-out, no feed is applied so any load stored on the grinding wheel and the workpiece is removed.

Furthermore, the grinding method as disclosed herein can be used on a conventional grinding machine or apparatus used for the same purpose and is not limited to certain grinding machines or the like.

Figure 5:
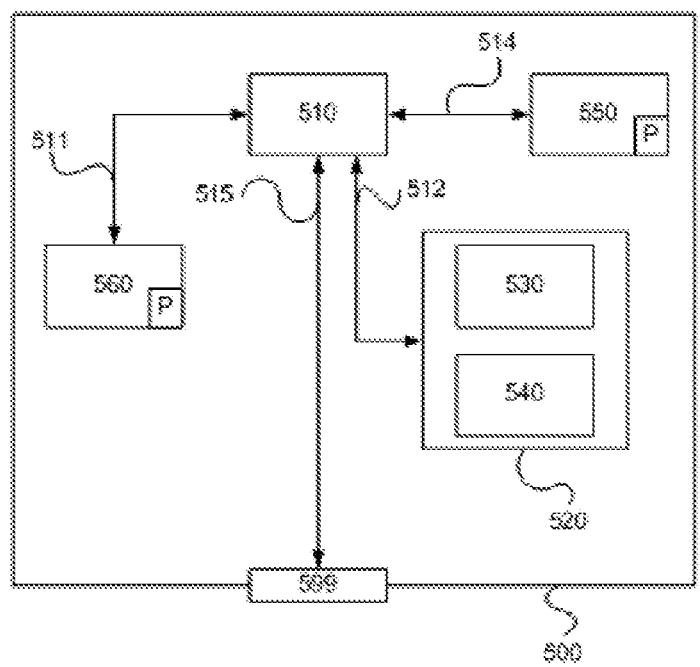
FIG. 5 schematically illustrates a device comprising a computer program according to an embodiment.

FIG. 5 is a diagram of an exemplified device 500. An electronic control unit of a grinding machine may for example comprise the exemplified device 500 or the device may be a separate unit from the grinding machine. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 may further comprise a bus controller, a serial communication port, I/O means, an A/D converter, a time and date input and transfer unit, an event counter and an interruption controller (not depicted). The non-volatile memory 520 has also a second memory element 540.

There is a computer program P provided which comprises routines for determining processing parameters of a grinding method for grinding a non-circular workpiece, which is rotated around a rotational axis, the workpiece grinded by means of an essentially rotational symmetrical grinding wheel, the grinding method comprising a first stage and a second stage, wherein the processing parameters are determined by iterating the first and second stage of the grinding method by the following steps:

a. selecting the total stock to be removed ($\delta$) from the workpiece as the stock removed in the first stage ($\delta_1$);

b. calculating a number of increments in the first stage ($n_1$) with a corresponding depth of cut ($a_{e1}$) for each increment in the first stage for achieving the stock removed in the first stage ($\delta_1$) while controlling the instantaneous workpiece rotational speed with the purpose of maintaining a pre-selected maximum surface temperature ($\theta^*$) of the workpiece;

c. calculating the grinding cycle time ($t_j$) resulting from the number of increments in the first stage and the instantaneous workpiece rotational speed obtained in step b;

d. in case the grinding cycle time ($t_j$) obtained in step c is equal to or less a grinding time ($t_{j-1}$) which would be achieved for a grinding cycle comprising one less increment in the first stage, repeating steps b and c for a grinding cycle comprising one additional increment until the grinding time obtained is greater than a grinding time for a grinding cycle comprising one less increment, thereby obtaining a calculated instantaneous workpiece rotational speed for the first stage, a calculated number of increments for the first stage ($n_1$) and a calculated depth of cut ($a_{e1}$) for each increment in the first stage;

e. calculating the stock removal ($\delta_2$) of the second stage using the calculated instantaneous workpiece rotational speed obtained from step d, a pre-selected number of increments ($n_2$) in the second stage and a pre-identified aggressiveness number of the second stage corresponding to a depth of cut ($a_{e2}$) during the second stage;

f. calculating the stock removal in the first stage ($\delta_1$) by subtracting the stock removal in the second stage ($\delta_2$) from the total stock removal ($\delta$) from the workpiece; and g. repeating steps b to f using the stock removal of first stage ($\delta_1$) obtained in step f until the same stock removal ($\delta_1$) for the first stage is achieved in step f as in the previous iteration of the first and the second stage;

thereby determining the instantaneous workpiece rotational speed, the number of increments in the first stage ($n_1$), the depth of cut ($a_{e1}$) in each increment in the first stage and the depth of cut ($a_{e2}$) in each increment in the second stage.

The computer program may further be arranged to provide the determined processing parameters to an electronic control unit or another computer connected to or adapted to communicate with the electronic control unit.

The computer program may be stored in an executable form in a compressed form in a memory 560 and/or in a read/write memory 550.

Where the data processing unit 510 is described as performing a certain function, it means that the data processing unit 510 effects a certain part of the program stored in the memory 560, or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The foregoing description of the exemplified embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method of grinding a workpiece, which is rotated around a rotational axis, by means of an essentially rotational symmetrical grinding wheel, said method comprising a first stage and a second stage, wherein a workpiece rotational speed in said first stage is controlled with the purpose of maintaining a pre-selected maximum surface temperature of the workpiece during said first stage, that a workpiece rotational speed in the second stage is controlled to be the same as the workpiece rotational speed in the first stage, and wherein grinding of the workpiece in said second stage is performed while controlling an aggressiveness number indicating a force of grinding in said second stage so as to achieve an intended final surface quality by a pre-selected number of feed increments in said second stage.

2. A method according to claim 1, wherein a depth of cut during the first stage is kept constant for each revolution of the workpiece.

3. A method according to claim 1, wherein the depth of cut during the second stage is constant for each revolution of the workpiece.

4. A method according to claim 1, wherein the aggressiveness number in the second stage is controlled by controlling a depth of cut in said second stage.

5. A method according to claim 1, wherein a depth of cut and a number of feed increments in the first stage are controlled so as to minimize the grinding time based on the pre-selected maximum surface temperature of the workpiece and the workpiece rotational speed.

6. A method according to claim 1, wherein the workpiece rotational speed for the first stage and the second stage, a number of feed increments in the first stage, a depth of cut for each increment during the first stage and a depth of cut for each increment in the second stage are determined by iterating the first and second stage using the pre-selected maximum surface temperature of the workpiece for the first stage, a pre-selected desired number of feed increments during the second stage and an experimentally determined aggressiveness number in the second stage so as to achieve an intended final surface quality.

7. A method according to claim 1, wherein the grinding wheel is rotated around a rotational axis which is essentially parallel to the rotational axis of the workpiece.

8. A method according to claim 1, wherein the rotational speed of the grinding wheel is the same for the first stage and the second stage.

9. A method according to claim 1, wherein the workpiece is a cam lobe.

10. A method of determining processing parameters of a grinding method for grinding a workpiece, which is rotated about a rotational axis, by means of an essentially rotationally symmetrical grinding wheel, the grinding method comprising a first stage and a second stage, wherein the method of determining the processing parameters comprises iterating the first and the second stage of the grinding method by the following steps:

a. selecting a total stock to be removed ($\delta$) from the workpiece as the stock removed in the first stage ($\delta_1$);

b. calculating a number of feed increments in the first stage ($n_1$) with a corresponding depth of cut ($a_{e1}$) for each increment in the first stage for achieving the stock removed in the first stage ($\delta_1$) while controlling an instantaneous workpiece rotational speed with the purpose of maintaining a pre-selected maximum surface temperature ($\theta^*$) of the workpiece;

c. calculating a grinding cycle time ($t_j$) resulting from the number of feed increments of the first stage and the instantaneous workpiece rotational speed obtained in step b;

d. in case the grinding cycle time ($t_j$) obtained in step c is equal to or less a grinding time ($t_{j-1}$) which would be achieved for a grinding cycle comprising one less increment in the first stage, repeating steps b and c for a grinding cycle comprising one additional increment until the grinding time obtained is greater than a grinding time for a grinding cycle comprising one less increment, thereby obtaining a calculated instantaneous workpiece rotational speed for the first stage, a calculated number of feed increments for the first stage ($n_1$) and a calculated depth of cut ($a_{e1}$) for each increment in the first stage;

e. calculating a stock removal ($\delta_2$) of the second stage using the calculated instantaneous workpiece rotational speed obtained from step d, a pre-selected number of feed increments ($n_2$) in the second stage and a pre-identified aggressiveness number indicating a force of grinding of the second stage corresponding to a depth of cut ($a_{e2}$) during the second staged;

f. calculating the stock removal in the first stage ($\delta_1$) by subtracting the stock removal in the second stage ($\delta_2$) from the total stock removal ($\delta$) from the workpiece; and g. repeating steps b to f using the stock removal of first stage ($\delta_1$) obtained in step f until the same stock removal ($\delta_1$) for the first stage is achieved in step f as in the previous iteration of the first and second stage, thereby determining the instantaneous workpiece rotational speed, the number of feed increments in the first stage ($n_1$), the depth of cut ($a_{e1}$) in each feed increment in the first stage and the depth of cut ($a_{e2}$) in each feed increment in the second stage.

11. A method according to claim 10, wherein the iterations are made using a constant wheel speed of the grinding wheel for the first and the second stage.

12. A method according to claim 10, wherein the iterations are made based on a constant depth of cut during the first stage of the grinding method.

13. A method according to claim 10, wherein the iterations are made based on a constant depth of cut during the second stage of the grinding method.

14. A computer program product for determining processing parameters of a grinding method, wherein said computer program product comprises computer program instructions stored on a non-transitory computer readable medium readable by a computer to cause one or more computer processors to perform the operations of:

a. selecting a total stock to be removed ($\delta$) from the workpiece as the stock removed in the first stage ($\delta_1$) (S1);

b. calculating a number of feed increments in the first stage ($n_1$) with a corresponding depth of cut ($a_{e1}$) for each increment in the first stage for achieving the stock removed in the first stage ($\delta_1$) while controlling an instantaneous workpiece rotational speed with the purpose of maintaining a pre-selected maximum surface temperature ($\theta^*$) of the workpiece (S2);

c. calculating a grinding cycle time ($t_j$) resulting from the number of feed increments of the first stage and the instantaneous workpiece rotational speed obtained in step b (S3);

d. in case the grinding cycle time ($t_j$) obtained in step c is equal to or less a grinding time ($t_{j-1}$) which would be achieved for a grinding cycle comprising one less increment in the first stage, repeating steps b and c for a grinding cycle comprising one additional increment until the grinding time obtained is greater than a grinding time for a grinding cycle comprising one less increment, thereby obtaining a calculated instantaneous workpiece rotational speed for the first stage, a calculated number of feed increments for the first stage ($n_1$) and a calculated depth of cut ($a_{e1}$) for each increment in the first stage (S4);

e. calculating a stock removal ($\delta_2$) of the second stage using the calculated instantaneous workpiece rotational speed obtained from step d, a pre-selected number of feed increments ($n_2$) in the second stage and a pre-identified aggressiveness number indicating a force of grinding of the second stage corresponding to a depth of cut ($a_{e2}$) during the second stage (S5);

f. calculating the stock removal in the first stage ($\delta_1$) by subtracting the stock removal in the second stage ($\delta_2$) from the total stock removal ($\delta$) from the workpiece (S6); and g. repeating steps b to f using the stock removal of first stage ($\delta_1$) obtained in step f until the same stock removal ($\delta_1$) for the first stage is achieved in step f as in the previous iteration of the first and second stage (S7), thereby determining the instantaneous workpiece rotational speed, the number of feed increments in the first stage ($n_1$), the depth of cut ($a_{e1}$) in each increment in the first stage and the depth of cut ($a_{e2}$) in each increment in the second stage.

15. A computer program product according to claim 14, wherein said computer program product further comprises computer program instructions to cause one or more computer processors to provide to an electronic control unit or another computer one or more of the instantaneous workpiece rotational speed, the number of feed increments in the first stage ($n_1$), the depth of cut ($a_{e1}$) in each increment in the first stage and the depth of cut ($a_{e2}$) in each increment in the second stage.

16. A method according to claim 1, wherein said workpiece has a non-circular shape.

17. A method according to claim 10, wherein said workpiece has a non-circular shape.

18. A computer program product according to claim 14, wherein said workpiece has a non-circular shape.

* * * * *

UNITED STATES PATENT AND TRADEMARK OFFICE
CERTIFICATE OF CORRECTION

PATENT NO. : 10,293,453 B2  
APPLICATION NO. : 15/310502  
DATED : May 21, 2019  
INVENTOR(S) : Peter Krajnik and Radovan Drazumeric Page 1 of 1

It is certified that error appears in the above-identified patent and that said Letters Patent is hereby corrected as shown below:

In the Claims

In Column 19, Claim 10, please change Line 26 to:
of cut ($a_{e2}$) during the second stage;

Signed and Sealed this
Ninth Day of July, 2019

Andrei Iancu
*Director of the United States Patent and Trademark Office*